US011767912B2

(12) United States Patent
Frister et al.

(10) Patent No.: US 11,767,912 B2
(45) Date of Patent: Sep. 26, 2023

(54) PARK LOCK SYSTEM WITH ADDED SAFETY FEATURES

(71) Applicant: Robert Bosch GmbH, Stuttgart (DE)

(72) Inventors: Frank Frister, West Bloomfield, MI (US); Martin Belley, Ann Arbor, MI (US); Axel Hahn, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 221 days.

(21) Appl. No.: 17/396,067

(22) Filed: Aug. 6, 2021

(65) Prior Publication Data

US 2021/0362692 A1 Nov. 25, 2021

Related U.S. Application Data

(62) Division of application No. 16/731,647, filed on Dec. 31, 2019, now Pat. No. 11,136,009.

(51) Int. Cl.
*F16H 63/34* (2006.01)
*B60T 1/00* (2006.01)
*F16H 63/48* (2006.01)

(52) U.S. Cl.
CPC .......... *F16H 63/3416* (2013.01); *B60T 1/005* (2013.01); *F16H 63/3475* (2013.01); *F16H 63/3491* (2013.01); *F16H 63/483* (2013.01)

(58) Field of Classification Search
CPC ............ F16H 63/3416; F16H 63/3475; F16H 63/3491; F16H 63/483; B60T 1/005
See application file for complete search history.

(56) References Cited

U.S. PATENT DOCUMENTS

| 6,287,236 | B1 | 9/2001 | Ishikawa |
| 7,025,188 | B2 | 4/2006 | Lindenschmidt et al. |
| 8,840,506 | B2 | 9/2014 | Schwekutsch et al. |
| 8,880,260 | B2 | 11/2014 | Nakagawara et al. |
| 10,443,723 | B2 | 10/2019 | Bormann |
| 2004/0237694 | A1* | 12/2004 | Lindenschmidt ... F16H 63/3416 74/473.21 |
| 2007/0283735 | A1* | 12/2007 | Schweiher ............ F16H 63/483 70/245 |

(Continued)

FOREIGN PATENT DOCUMENTS

DE 102017103317 8/2018
WO WO-2019001831 A1 * 1/2019 ............ F16H 57/02

*Primary Examiner* — Lori Wu
(74) *Attorney, Agent, or Firm* — Maginot, Moore & Beck LLP

(57) ABSTRACT

A park lock system for a vehicle transmission, includes a movable primary carrier, a secondary carrier, a rod, a first biasing member, an engagement carrier, and a first actuator. The movable primary carrier defines a primary internal space. The secondary carrier is located within the primary internal space and is movable relative to the primary carrier. The rod fixedly extends from the secondary carrier and includes a rod portion located outside of the primary internal space. The first biasing member is located within the primary internal space between the secondary carrier and the primary carrier. The engagement carrier is configured to receive the rod portion and includes a terminal portion operably connected to a pawl and a park lock wheel arrangement to lock and unlock the vehicle transmission. The first actuator is configurable in a first state or a second state.

14 Claims, 6 Drawing Sheets

(56) References Cited

U.S. PATENT DOCUMENTS

2009/0326767  A1      12/2009  Kamada et al.
2017/0234427  A1*     8/2017   Hofkirchner ....... F16H 63/3425
                                                    192/219.5
2021/0172520  A1*     6/2021   Wiesner ............. F16H 63/3483

* cited by examiner

PARK LOCK SYSTEM WITH ADDED SAFETY FEATURES

This application is a divisional of application Ser. No. 16/731,647, filed on Dec. 31, 2019, the disclosure of which is incorporated herein by reference in its entirety.

FIELD

This disclosure relates to the field of vehicle drivetrains and, in particular, to transmissions.

BACKGROUND

Vehicles, such as automobiles, typically include a transmission to provide speed and torque conversion from an engine or a traction motor to the drive wheels. Often, transmissions in automobiles are automatic transmissions that function without the user operating a foot-controlled clutch pedal. Automatic transmissions may have one or more fixed gear ratios or have a continuously variable gear ratio, for example. Typically, automatic transmissions have a park mode, a reverse mode, a neutral mode, and a drive mode. In the park mode, the vehicle is prevented from moving. In the reverse mode, the engine or traction motor is connected to the drive wheels to move the vehicle in a backwards or reverse direction. In the neutral mode, the vehicle may move or roll, but the engine or traction motor is disconnected from the drive wheels. In the drive mode, the engine or traction motor is connected to the drive wheels to move the vehicle in a forward direction.

Automatic transmissions include a parking pawl that is movable to an unlocked position and a locked position. The parking pawl is moved to the unlocked position when motion of the vehicle is desired, such as when the transmission is in the reverse mode, the neutral mode, and the drive mode. The parking pawl is moved to the locked position, when it is desired to prevent motion of the vehicle, such as when the transmission is in the park mode.

In modern vehicles, the movement of the parking pawl is electronically controlled by a park lock system. If a supply of electricity to the park lock system is lost, then the vehicle may behave unpredictably. For example, wheels of the vehicle may become locked or prevented from rotating while the vehicle is in motion or, alternatively, the park lock system may become prevented from stopping rotation of the wheels while the vehicle should be immobilized. Accordingly, further developments for park lock systems of automatic transmissions are desired.

SUMMARY

According to an exemplary embodiment of the disclosure, a park lock system for a vehicle transmission includes a movable primary carrier, a secondary carrier, a rod, a first biasing member, an engagement carrier, and a first actuator. The movable primary carrier defines a primary internal space. The secondary carrier is located within the primary internal space and is movable relative to the primary carrier. The rod fixedly extends from the secondary carrier and includes a rod portion located outside of the primary internal space. The first biasing member is located within the primary internal space between the secondary carrier and the primary carrier. The engagement carrier is configured to receive the rod portion and includes a terminal portion operably connected to a pawl and a park lock wheel arrangement to lock and unlock the vehicle transmission. The first actuator is configurable in a first state or a second state. In the first state of the first actuator (i) the first actuator prevents movement of the secondary carrier relative to the primary carrier, (ii) movement of the primary carrier to a park position locks the vehicle transmission, and (iii) movement of the primary carrier to a drive position unlocks the vehicle transmission. In the second state of the first actuator (i) the secondary carrier is movable relative to the primary carrier, and (ii) the vehicle transmission is locked independent of the position of the primary carrier.

According to another exemplary embodiment, a method is disclosed for operating a park lock system for a vehicle having a primary supply voltage operably connected to the park lock system, a secondary supply voltage operably connected to the park lock system, and a traction motor. The method includes configuring the park lock system to unlock a transmission of the vehicle, detecting that the primary supply voltage is available or unavailable with a control unit of the park lock system, and detecting that the secondary supply voltage is available or unavailable to the control unit. The method further includes configuring the park lock system to lock the transmission of the vehicle when the primary supply voltage and the secondary supply voltage are both unavailable with the control unit. When the primary supply voltage is unavailable and the secondary supply voltage is available, monitoring a wheel speed of a wheel of the vehicle with a wheel speed sensor operably connected to the control unit, detecting if wheel locking of the wheel is occurring with the wheel speed sensor, and configuring the park lock system to lock the transmission when the monitored wheel speed is less than a predetermined speed value and no wheel locking is detected.

According to a further exemplary embodiment of the disclosure, a park lock system for a vehicle transmission includes a pawl, a rod, a primary carrier, a biasing member, and an actuator. The pawl is movable to a locked position relative to a park lock wheel and is biased toward an unlocked position relative to the park lock wheel. The rod is operably connected to the pawl and is movable to an engaged position and a disengaged position. In the engaged position the pawl is pressed toward the locked position to lock the transmission, and in the disengaged position the pawl is biased to the unlocked position to unlock the transmission. The primary carrier is operably connected to the rod and is movable to a park position and a drive position. The biasing member is located within the primary carrier. The actuator is operably connected to the rod and is configurable in a first state and a second state. When the actuator is in the first state (i) movement of the primary carrier to the park position moves the rod to the engaged position, and (ii) movement of the primary carrier to the drive position moves the rod to the disengaged position. When the actuator is in the second state the biasing member moves the rod to the disengaged position independent of a position of the primary carrier.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
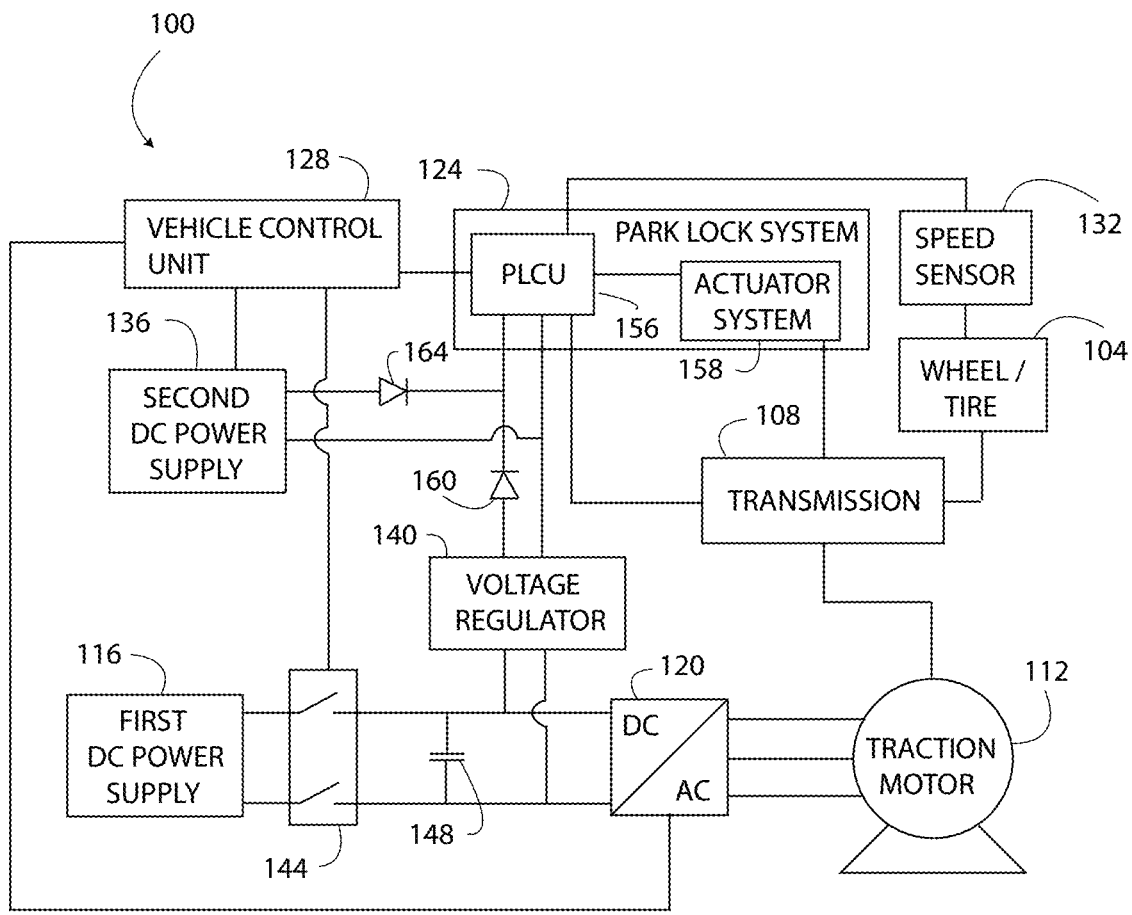
FIG. 1 is a block diagram of a vehicle including a transmission and a park lock system, as disclosed herein.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

As shown in FIG. 1, a vehicle 100 includes a wheel 104 operably connected to a transmission 108 that is driven by a traction motor 112 supplied with electrical energy from a first DC power supply 116 through a DC/AC inverter 120. The vehicle 100 also includes a park lock system 124 that is operably connected to the transmission 108, a vehicle control unit 128, and a wheel speed sensor 132. The park lock system 124 is supplied with electrical energy from a second DC power supply 136 and/or a voltage regulator 140 operatively connected to a high voltage DC link capacitor 148. As set forth herein, the park lock system 124 is an energy efficient system and is configured to improve operation of the vehicle 100 when the second DC power supply 136 has an output that is below a predetermined value. Each element of the vehicle 100 is described herein followed by an exemplary method 600 (FIG. 6) of operating the park lock system 124.

The vehicle 100 is inclusive of any ground-based means of carrying or transporting something or someone, including automobiles, trucks, and tractors. The vehicle 100 includes road-going vehicles, private vehicles, commercial vehicles, off-road vehicles, recreational vehicles, and agricultural vehicles. In one embodiment, the vehicle 100 is a fully-electric automobile with four of the wheels 104, and is suitable for operation on public motorways. The vehicle 100 also includes hybrid electric vehicles that include a combustion engine (not shown), and hydrogen fuel cell vehicles that convert hydrogen into electrical energy for powering the traction motor 112.

The transmission 108 is operably connected to at least one of the wheels 104 and to the traction motor 112. The transmission 108 is inclusive of all types of automatic transmissions (i.e. self-shifting transmissions), such as those based on planetary gear arrangements and continuously variable transmissions (CVT). Moreover, the transmission 108 also includes at least some types of semi-automatic configurations including dual-clutch transmissions (DCT) that have a park mode. In one embodiment, the transmission 108 is a single-speed gearbox transmission configured to direct a torque output from the traction motor 112 to the driven wheel(s) 104, and provides calibrated gear reduction. That is, the transmission 108 enables the traction motor 112 to rotate at a greater rotational speed than the driven wheel 104. The transmission 108 provides lower traction motor 112 input speeds, decreased power usage from the first DC power supply 116, and increased torque output capacity.

The transmission 108, in one embodiment, has a park mode, a reverse mode, a neutral mode, and a drive mode. In the park mode, an output (not shown) of the transmission 108 is locked (by a pawl 216 engaging a park lock wheel 220, see FIG. 2) and is prevented from rotating to hold the vehicle 100 in a stationary position, under most circumstances. In the reverse mode, the transmission 108 couples the traction motor 112 to the drive wheel 104 in a manner that causes rotation of an output shaft (not shown) of the traction motor 112 to rotate the drive wheel 104 in a direction that reverses the vehicle 100. In the neutral mode, the transmission 108 decouples the traction motor 112 from the drive wheel 104, such that the drive wheel 104 is free to rotate without connection to the traction motor 112 and the traction motor 112 is free to rotate without moving the vehicle 100. In the drive mode, the transmission 108 couples the traction motor 112 to the drive wheel 104 in a manner that causes rotation of the output shaft of the traction motor 112 to rotate the drive wheel 104 in a direction that moves the vehicle 100 in a forward direction.

With reference still to FIG. 1, the traction motor 112 is an electric motor. The output shaft of the traction motor 112 is operably connected to the transmission 108 for transmitting torque to the transmission 108. The transmission 108 transfers the torque from the traction motor 112 to the drive wheel 104 to propel the vehicle 100 in either the forward direction or the reverse direction. In the illustrated embodiment, the traction motor 112 is a three phase AC induction motor, but in other embodiments, the traction motor 112 is any suitable electric motor such as a brushless DC motor or a permanent magnet synchronous motor. The traction motor 112 is also operable in a generator mode in which the traction motor 112 converts potential energy of the moving vehicle 100 into electricity. The generator mode of the traction motor 112 is also referred to herein as regenerative mode.

The DC/AC inverter 120 is configured to convert DC voltage and DC current from the first DC power supply 116 into AC voltage and AC current for electrically powering the traction motor 112. The DC/AC inverter 120 is also referred to herein as a power inverter. The DC/AC inverter 120 is further configured to convert AC voltage and AC current generated by the traction motor 112 operating in the generator mode in DC voltage and DC current for charging the capacitor 148.

The first DC power supply 116 is a rechargeable battery system that includes one or more rechargeable battery cells (not shown). The first DC power supply 116 is also referred to herein as an electric-vehicle battery and a traction battery. The first DC power supply 116 supplies electrical power to the traction motor 112 through the DC/AC inverter 120 for moving the vehicle 100. In one embodiment, the first DC power supply 116 is a plurality of rechargeable lithium-ion battery cells. In other embodiments, the first DC power supply 116 is any other battery technology suitable for supplying sufficient electrical energy to the traction motor 112 for moving the vehicle 100. The first DC power supply 116 indirectly supplies electrical energy for operating the park lock system 124 during a failure of the second DC power supply 136 by charging the capacitor 148.

The vehicle 100 further includes switches 144 and the capacitor 148 connected to the first DC power supply 116. The switches 144 are operably connected to the vehicle control unit 128 and are electronically controllable by the vehicle control unit 128. In particular, the switches 144 are configured to electrically connect and to electrically disconnect the first DC power supply 116 from the DC/AC inverter 120 and the capacitor 148. When the switches 144 are in an open configuration, the first DC power supply 116 is electrically disconnected from the DC/AC inverter 120 and the capacitor 148. When the switches 144 are in a closed configuration, the first DC power supply 116 is electrically connected to the DC/AC inverter 120 and the capacitor 148. In one embodiment, the switches 144 are normally open switches. Accordingly, the switches 144 receive an electric control signal from the vehicle control unit 128 to close during operation of the vehicle 100. When the electric control signal is not supplied to the switches 144 (such as during a failure of the second DC power supply 136), the switches 144 default to the open configuration that disconnects the first DC power supply 116 from the DC/AC inverter 120 and the capacitor 148.

The capacitor 148 is electrically connected to the terminals of the first DC power supply 116 through the switches 144 and is electrically connected to the DC/AC inverter 120. The capacitor 148 is an electrical signal filtering capacitor used to filter high frequency signals from passing to the first DC power supply 116 from the DC/AC inverter 120, for example. The capacitor 148 is also an energy storage device configured to store the electrical energy recovered, generated, or "regenerated" by the traction motor 112 when the traction motor 112 is operated in the generator mode. Additionally, when the switches 144 are closed, the capacitor 148 stores energy from the first DC power supply 116. The capacitor 148 is referred to herein as a secondary supply voltage of the park lock system 124.

With reference again to FIG. 1, the park lock system 124 includes a park lock control unit 156 operably connected to a mechanical actuator system 158. The park lock system 124 is electrically connected to the transmission 108, the vehicle control unit 128, the speed sensor 132, the second DC power supply 136, and the voltage regulator 140. Specifically, the control unit 156 is electrically connected to the vehicle control unit 128, and the actuator system 158 is mechanically connected to the transmission 108. The control unit 156 is provided as a microprocessor, a processor, a controller, or any other type of electronic control device configured to execute program instructions stored in a memory (not shown).

The vehicle control unit 128 controls the electrical components of the vehicle 100 and generates data that is received by the park lock system 124. For example, the vehicle control unit 128 enables the park lock control unit 156 to determine the state of the vehicle 100 in connection with operating the transmission 108. In one embodiment, the vehicle control unit 128 transmits data to the park lock control unit 156 indicating if the vehicle 100 is in the park mode, the reverse mode, the neutral mode, or the drive mode of the transmission 108. The vehicle control unit 128 transmits any other data required by the park lock control unit 156 for operating the park lock system 124. The vehicle control unit 128 may be connected to the park lock system 124 via a CAN bus.

The voltage regulator 140 is electrically connected to the park lock system 124, the capacitor 148, and the DC/AC inverter 120. The voltage regulator 140 converts the voltage stored in the capacitor 148 and/or the voltage output by DC/AC inverter 120 to a voltage level suitable for powering at least the park lock system 124. In one embodiment, the voltage regulator 140 includes a transformer (not shown) and a rectifier assembly (not shown).

An output diode 160 or other reverse blocking device is electrically connected to at least one of the two outputs of the voltage regulator 140 to prevent the voltage regulator 140 from receiving electrical current from the second DC power supply 136. In one embodiment, the output "diode" 160 is provided as or includes a MOSFET.

The second DC power supply 136 is a rechargeable battery or battery system that includes one or more rechargeable battery cells (not shown). The second DC power supply 136 is spaced apart from and is different from the first DC power supply 116 and is operably connected to the park lock system 124. The second DC power supply 136 is referred to herein as a primary supply voltage of the park lock system 124. The second DC power supply 136 supplies electrical power to accessories and on-board systems of the vehicle 100, such as the park lock system 124, but the second DC power supply 136 is typically not configured to supply the traction motor 112 with electrical energy. In one embodiment, the second DC power supply 136 is a plurality of rechargeable lithium-ion battery cells. In other embodiments, the second DC power supply 136 is any other battery technology suitable for supplying sufficient electrical energy to the accessories of the vehicle 100, such as a lead-acid battery.

An output diode 164 or other reverse blocking device is electrically connected to at least one of the two outputs of the second DC power supply 136 to prevent the second DC power supply 136 from receiving electrical current from the voltage regulator 140. In one embodiment, the output "diode" 164 is provided as or includes a MOSFET.

The speed sensor 132 is configured to sense a rotational speed of the wheel 104 of the vehicle 100. The speed sensor 132 is operably connected to the wheel 104 and to the park lock system 124. In some embodiments, the speed sensor 132 is included as an element of the park lock system 124. The speed sensor 124 generates an electrical output that corresponds to a rotational speed or angular velocity of the monitored wheel 104. Thus, the output of the speed sensor 132 typically corresponds to the speed of the vehicle 100. The vehicle 100 may include only one speed sensor 132, or the vehicle 100 may include a speed sensor 132 for each wheel 104 so that the rotational speed of each individual wheel 104 is determined. In one embodiment, the speed sensor 124 is provided as a Hall Effect sensor.

Additionally or alternatively, the speed sensor 132 is included as a rotational position sensor (not shown) of the traction motor 112. That is, in one embodiment, the rotational speed of the driven wheels 104 is determined using an electrical output of the rotational position sensor of the traction motor 112.

Figure 2:
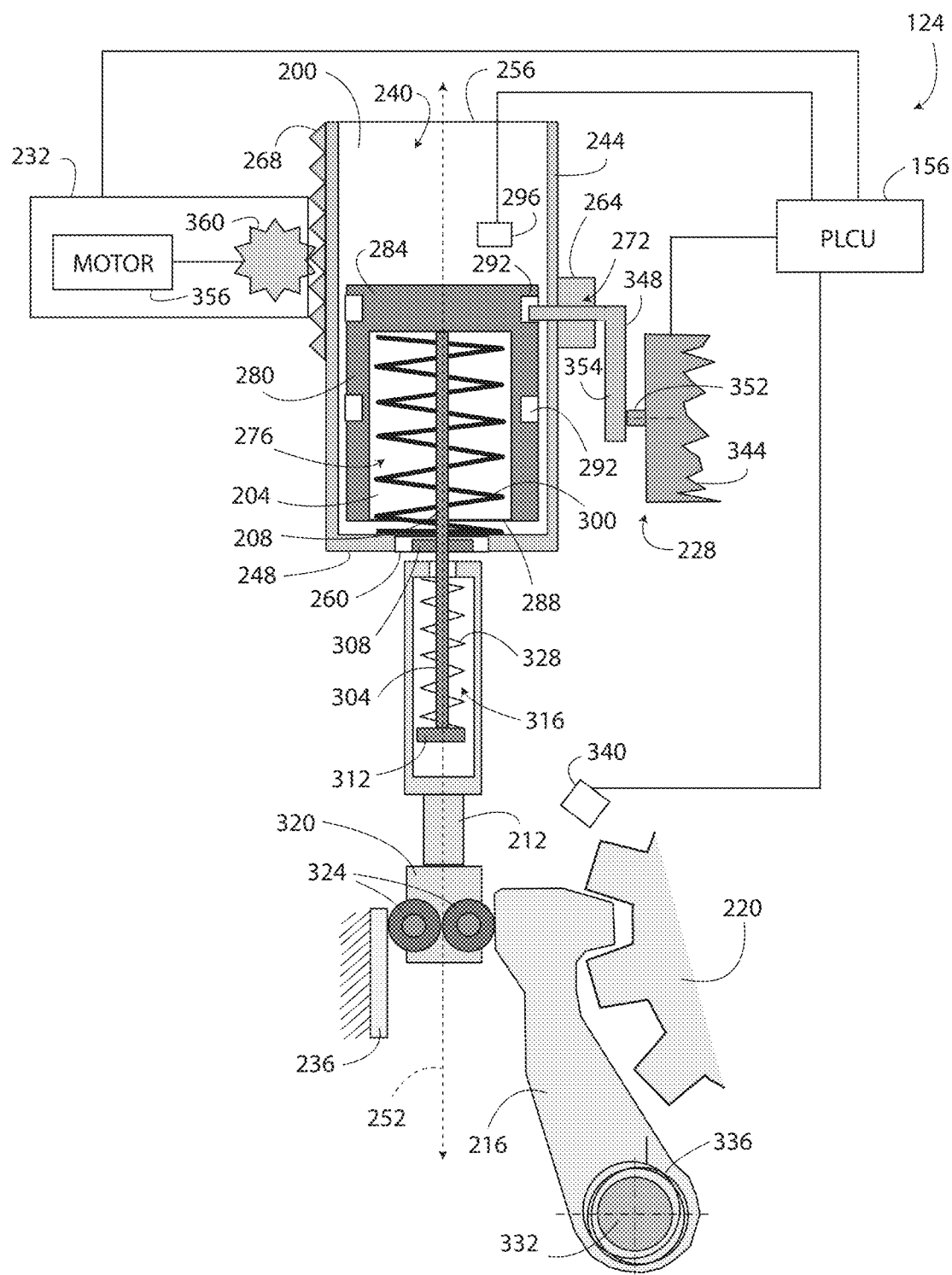
FIG. 2 is an elevational view of the park lock system of FIG. 1 shown partially in cross section, the park lock system is shown with the transmission in a park mode and in a normal operating mode.

With reference to FIG. 2, the actuator system 158 of the park lock system 124 includes a primary carrier 200, a secondary carrier 204, an engagement rod 208, and an engagement carrier 212 engaged with the pawl 216 and the park lock wheel 220 of the transmission 108 of the vehicle 100. The park lock system 124 further includes a first actuator 228 and a second actuator 232. The park lock system 124 is configured for operation with the park lock wheel 220, the pawl 216, and a stop wall 236 of the transmission 108. The park lock system 124 is configured to lock and to unlock the transmission 108 by moving the pawl 216 into and out of engagement with the park lock wheel 220. The transmission 108 is locked by the park lock system in FIG. 2. Each component of the park lock system 124 is described below.

Figures 3A, 3B, 3C:
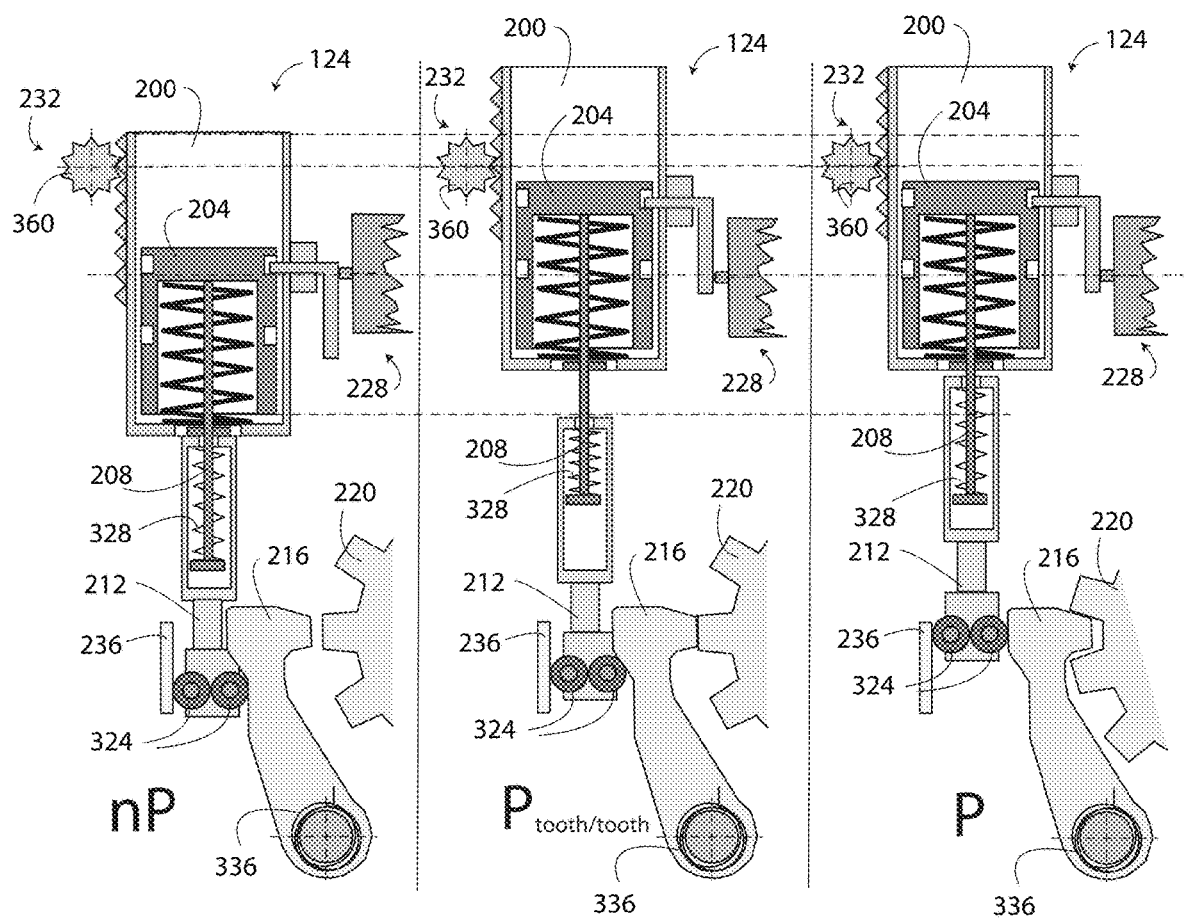
FIG. 3A is an elevational view of the park lock system of FIG. 1, showing a primary carrier of the park lock system in a drive position and a pawl of the park lock system in an unlocked position corresponding to a drive mode of the transmission.
FIG. 3B is an elevational view of the park lock system of FIG. 1, showing the primary carrier in a park position and the pawl in an intermediate tooth-on-tooth configuration.
FIG. 3C is an elevational view of the park lock system of FIG. 1, showing the primary carrier in the park position and the pawl in a locked position corresponding to the park mode of the transmission.

The primary carrier 200, in one embodiment, is a hollow generally cylindrical structure that defines a primary internal space 240. The primary carrier 200 includes a sidewall 244 and a bottom wall 248 and is formed from metal, plastic, or any other suitably strong material. The primary carrier 200 is movable along a longitudinal axis 252 of the park lock system 124 to a park position (FIG. 2) and a drive position (FIG. 3A). The primary carrier 200 includes an upper opening 256 to the primary internal space 240, a lower opening 260 through the bottom wall 248 to the primary internal space 240, a sleeve 264, and a rack 268. The lower opening 260 is also referred to herein as an engagement opening.

The sleeve 264 of the primary carrier 200 is connected to the sidewall 244 and defines a side opening 272 through the sleeve 264 and through the sidewall 244 into the primary internal space 240.

The rack 268 of the primary carrier 200 is mounted on the sidewall 244 and is configured to engage a pinon gear 360 of the second actuator 232, as described below.

Figures 4A, 4B, 4C:
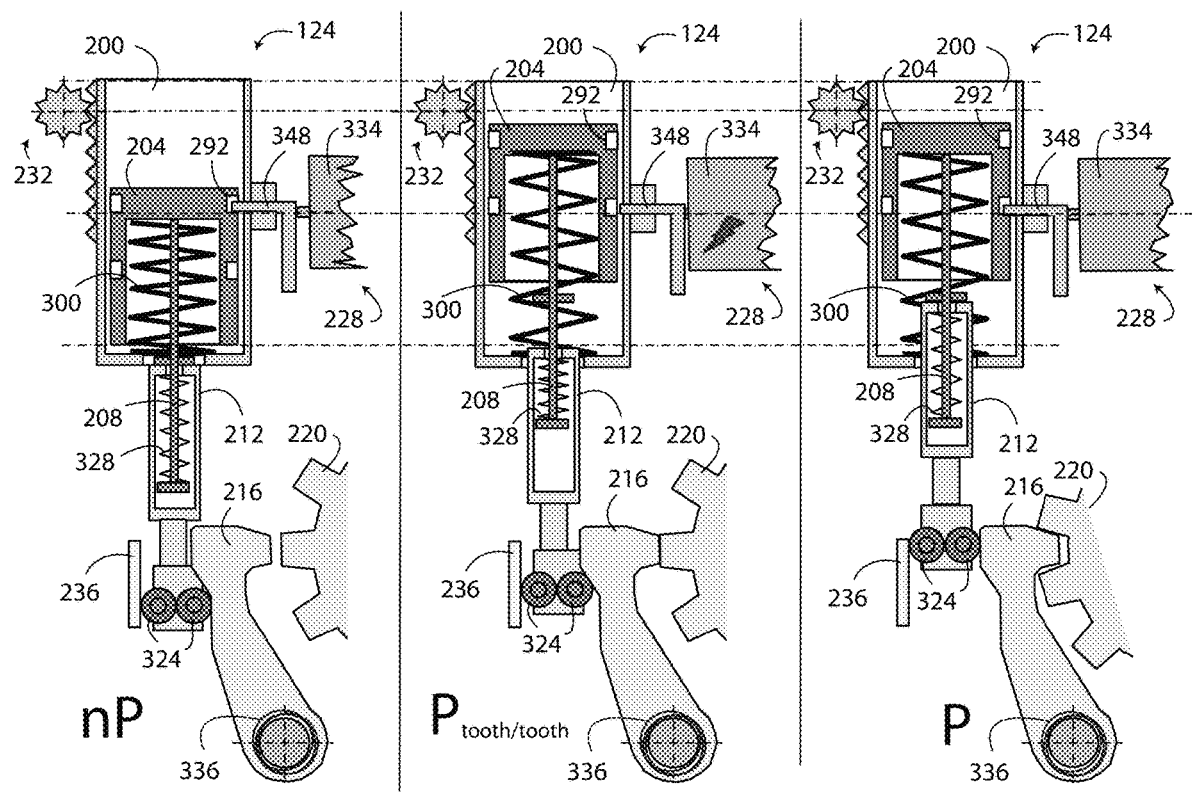
FIG. 4A is an elevational view substantially the same FIG. 3A and is included for convenience of description.
FIG. 4B is an elevational view of the park lock system of FIG. 1, showing the primary carrier in the drive position, the secondary carrier in a failsafe position, and the pawl in the intermediate tooth-on-tooth configuration.
FIG. 4C is an elevational view of the park lock system of FIG. 1, showing the primary carrier in the drive position, the secondary carrier in the failsafe position, and the pawl in the locked position of the park mode of the transmission.

The secondary carrier 204 is located within the primary internal space 240 and is configured for movement on the longitudinal axis 252 relative to the primary carrier 200. The secondary carrier 204, in one embodiment, is a hollow generally cylindrical structure that defines a secondary internal space 276. The secondary carrier 204 includes a sidewall 280 and a top wall 284 and is formed from metal, plastic, or any other suitably strong material. The secondary carrier 204 defines a lower opening 288 to the secondary internal space 276 and a plurality of detents 292 formed in the sidewall 280. The secondary carrier 204 is movable along the longitudinal axis 252 to a normal position (FIG. 2) and a failsafe position (FIG. 4B). An outside diameter of the secondary carrier 204 is slightly smaller than an inside diameter of the primary internal space 240.

The park lock system 124 further includes a position sensor 296 operably connected to the primary carrier 200 and electrically connected to the control unit 156. The position sensor 296 is configured to generate an electrical output that corresponds to the position of the secondary carrier 204 relative to the primary carrier 200. The position sensor 296 generates a first output when the secondary carrier 204 is in the normal position, and the position sensor 296 generates a different second output when the secondary carrier 204 is in the failsafe position.

With reference still to FIG. 2, a main biasing member 300 is located within the primary internal space 240 and is at least partially located within the secondary internal space 276 depending on the position of the secondary carrier 204 relative to the primary carrier 200. The main biasing member 300, in one embodiment, is a compression spring configured to bias the secondary carrier 204 toward the upper opening 256 of the primary carrier 200. The main biasing member 300 is located between the top wall 284 of the secondary carrier 204 and the bottom wall 248 of the primary carrier 200.

The engagement rod 208 fixedly extends from the top wall 284 of the secondary carrier 204 into the secondary internal space 276, the primary internal space 240, and through the lower openings 260, 288. Accordingly, the rod 208 includes an outside rod portion 304 that is located outside of the primary internal space 240 and the secondary internal space 276. The rod 208 further includes an upper stop structure 308 and a lower stop structure 312 fixedly extending from the rod 208. The rod 208 is operably connected to the primary carrier 200 through the secondary carrier 204. The rod 208 is also operably connected to the pawl 216 through the engagement carrier 212. The rod 208 is movable to an engaged position (FIGS. 2 and 3C) and a disengaged position (FIG. 3A). The position of the rod 208, in one embodiment, is relative to the pawl 216 and the park lock wheel 220 and not the primary carrier 200.

The engagement carrier 212 is configured to receive at least a portion of the outside rod portion 304 and to move relative to the rod 208 between the upper stop structure 308 and the lower stop structure 312. The engagement carrier 212 defines an engagement internal space 316 and a terminal portion 320. The terminal portion 320 is operably connected to the pawl 216 and the park lock wheel 220 and, in one embodiment, includes a plurality of rollers 324 that roll against the pawl 216 and the stop wall 236.

As shown in FIG. 2, a secondary biasing member 328 is located within the engagement internal space 316. The secondary biasing member 328, in one embodiment, is a compression spring configured to bias the engagement carrier 212 toward the secondary carrier 204.

The pawl 216 is configured to pivot about a fixed shaft 332 to locked position (FIG. 2), an intermediate tooth-on-tooth position (FIG. 3B), and an unlocked position (FIG. 3A). A biasing member 336 biases the pawl 216 toward the unlocked position. In one embodiment, the pawl 216 is an element of the park lock system 124, and, in another embodiment, the pawl 216 is an element of the transmission 108.

The park lock wheel 220 is operably connected to an output shaft (not shown) of the transmission 108 for rotation with the output shaft. In particular, the park lock wheel 220 rotates when the vehicle 100 is in motion and the transmission 108 is in the drive mode or the reverse mode. When motion of the vehicle 100 is desired, the park lock system 124 is configured to move the pawl 216 to the unlocked position to enable rotation of the park lock wheel 220 and the driven wheel 104 of the vehicle 100. When motion of the vehicle 100 is not desired, such as when the vehicle 100 is in the park mode, the park lock system 124 is configured to move the pawl 216 to the locked position. With the pawl 216 in the locked position, the pawl 216 prevents rotation of the park lock wheel 220 and the output shaft of the transmission 108, which also prevents movement of the vehicle 100.

Another speed sensor 340 is electrically connected to the control unit 156 and is configured to generate an electrical output corresponding to a rotational speed of the park lock wheel 220. Thus, the output of the speed sensor 340 corresponds to the speed of vehicle 100 at least when the transmission 108 is in the drive mode and the reverse mode. In one embodiment, the speed sensor 340 is provided as a Hall Effect sensor.

In FIG. 2, the first actuator 228 of the park lock system 124 includes, in one embodiment, a solenoid 344 and a pin 348. The first actuator 228 is operably connected to the rod 208 through the secondary carrier 204. The solenoid 344 is electrically connected to the control unit 156 and is configurable in an energized state (FIG. 4B) and a de-energized state (FIG. 2). The pin 348 fixedly extends from a plunger 352 of the solenoid 344. When the solenoid 344 is in the de-energized state, in which the solenoid 344 is not supplied with electrical energy, the pin 348 extends through the opening 272 in the sleeve 264 and into one of the detents 292 of the secondary carrier 204, as shown in FIG. 2. In the de-energized state, the first actuator 228 prevents movement of secondary carrier 204 relative to the primary carrier 200 by holding the secondary carrier 204 in position with the pin 348. When the solenoid 344 is in the energized state, in which the solenoid 344 is supplied with electrical energy, the plunger 352 and the pin 348 are retracted, such that the pin 348 is removed from the detent 292 in the secondary carrier 204. In the energized state, the secondary carrier 204 is movable relative to the primary carrier 200, typically in response to the biasing force of the biasing member 300. The state of the solenoid 344 is controlled by the control unit 156 with data from at least one of the vehicle control unit 128, the speed sensor 132, the position sensor 296, and the speed sensor 340.

The pin 348 of the solenoid 344 is configured to slide on the plunger 352 in response to movement of the primary carrier 200. To this end, the pin 348 includes a slide arm 354 that slides on the plunger 352 to a first position (FIG. 2) and a second position (FIG. 3A). As such, the solenoid 344 is configured to remain stationary in response to movement of the primary carrier 200

The second actuator 232 of the park lock system 124 includes, in one embodiment, a motor 356 operably connected to the pinon 360. The motor 356 is electrically connected to the control unit 156. The motor 356 is mechanically connected to the pinon 360 and is configured to rotate the pinon 360. The pinon 360 is engaged with the rack 268 on the primary carrier 200. Accordingly, through rotation of the pinon 360, the second actuator 232 is configured to move the primary carrier 200 to the park position and the drive position.

Operation of the park lock system 124 is first described with reference to FIGS. 3A, 3B, and 3C, which illustrate a normal means of operating the park lock system 124 to lock and to unlock the transmission 108. As shown in FIG. 3A, the first actuator 228 has secured the secondary carrier 204 in the normal position and has prevented movement of the secondary carrier 204 relative to the primary carrier 200. The second actuator 232 has moved the primary carrier 200 to the drive position, which causes the rollers 324 of the engagement member 212 to slide to a position that enables the biasing member 336 to bias the pawl 216 to the unlocked position. As configured in FIG. 3A, the park lock wheel 220 is free for rotation and the transmission 108 is free to drive the wheel 104 to move the vehicle 100. The transmission 108 is unlocked in FIG. 3A.

With reference to FIG. 3B, the park lock system 124 has received an electronic signal from the control unit 156 (FIG. 2) indicating that the transmission 108 should be configured in the park mode and locked. Accordingly, the control unit 156 causes the second actuator 232 to rotate the pinon 360 to lift the primary carrier 200 to the park position. In doing so, the engagement carrier 212 begins to move upward, but is stopped when the pawl 216 becomes bound against the park lock wheel 220, thereby trapping the rollers 324 between the pawl 216 and the wall 236. As the primary carrier 200, the secondary carrier 204, and the rod 208 continue to move upward, the biasing member 328 is compressed and a biasing force is generated that forces the engagement carrier 212 toward the primary carrier 200 and forces the pawl 216 toward the locked position.

As shown in FIG. 3C, a slight motion of the vehicle 100 has caused the park lock wheel 220 to rotate slightly, and the biasing force generated by the biasing member 328 has lifted the engagement carrier 212 and pressed the pawl 216 into the locked position. In FIG. 3C, the transmission 108 is in the park mode and is locked, such that motion of the vehicle 100 is prevented by the park lock assembly 124. Thus, FIGS. 3A, 3B, and 3C illustrate the park lock system 124 changing the transmission 108 from the unlocked configuration when the vehicle 100/transmission 108 is the drive or reverse mode (FIG. 3A), to the locked configuration when the vehicle 100/transmission 108 is in the park mode (FIG. 3C) during normal operation of the park lock assembly 124.

The second actuator 232 is used to move the primary carrier 200 from the park position to the drive position to unlock the transmission 108, as shown in FIG. 3A, when motion of the vehicle 100 is desired again.

The park lock system 124 may be supplied with electrical energy from either the first or the second DC power supplies 116, 136 during normal operation, but is typically supplied with electrical energy from only the second DC power supply 136.

In FIGS. 3A, 3B, and 3C, the first actuator 228 is in the de-energized state (i.e. a first state), and the first actuator 228 prevents movement of the secondary carrier 204 relative to the primary carrier 200 as the primary carrier 200 is moved to the drive position and to the park position. Moreover in FIGS. 3A, 3B, and 3C, movement of the primary carrier 200 to the park position locks the transmission 108, and movement of the primary carrier 200 to the drive position unlocks the transmission 108. Stated differently in FIGS. 3A, 3B, and 3C, when the first actuator 228 is in the first state (i.e. the de-energized state) movement of the primary carrier 200 to the park position moves the rod 208 to the engaged position, and movement of the primary carrier 200 to the drive position moves the rod 208 to the disengaged position. When the rod 208 is in the engaged position, the pawl 216 is pressed toward the locked position to lock the transmission 108, and when the rod 208 is in the disengaged position the pawl 216 is biased by the biasing member 336 to the unlocked position to unlock the transmission 108.

Operation of the park lock system 124 is described with reference to FIGS. 4A, 4B, and 4C, which illustrate a failsafe means of operating the park lock system 124. FIG. 4A is the same as FIG. 3A and illustrates the park lock system 124 in the unlocked configuration when the transmission 108 is in the drive mode.

FIG. 4B illustrates a "default to park" configuration of the park lock system 124 that is instituted by configuring the first actuator 228 in the energized state. In FIG. 4B, for reasons discussed further below in connection with the method 600, the second actuator 232 is unavailable to return the primary carrier 200 to the park position due to an electrical issue, for example. In such a situation, the first actuator 228 is available to configure the park lock system 124 for locking the transmission 108 using very little electrical energy. Specifically, in FIG. 4B, the solenoid 334 of the first actuator 228 is energized, thereby withdrawing the pin 348 from the detent 292 in the secondary carrier 204. Without the pin 348 in the detent 292, the biasing member 300 lifts the secondary carrier 204 from the normal position to the failsafe position and moves the rod 208 from the disengaged position to the engaged position. With the secondary carrier 204 in the failsafe position, the biasing member 328 is compressed in FIG. 4B. That is, the biasing member 300 exerts a stronger biasing force than the biasing member 328, thereby enabling the biasing member 300 to lift the secondary carrier 204 and to compress the biasing member 328.

In the failsafe position of FIG. 4B, the engagement carrier 212 moves upward, but is stopped when the pawl 216 becomes bound against the park lock wheel 220, thereby trapping the rollers 324 between the pawl 216 and the wall 236. The biasing member 328 forces the engagement carrier 212 toward the secondary carrier 204 and forces the pawl 216 toward the locked position. Stated differently, after the first actuator 228 is energized and the pin 348 is removed from the detent 292, the biasing member 300 biases the secondary carrier 204, the rod 208, and the engagement carrier 212 away from the pawl 216 and toward the upper opening 256 along the longitudinal axis 252. In FIG. 4B, the biasing member 300 moves the rod 208 to the disengaged position independent of a position of the primary carrier 200. Moreover, with the secondary carrier 204 in the failsafe position, the biasing member 300 biases a portion of the engagement carrier 212 into the primary internal space 240 through the engagement opening 260.

In FIG. 4C slight motion of the vehicle 100 has rotated slightly the park lock wheel 220 and the pawl 216 has seated in the locked position. Moreover, in FIG. 4C the primary carrier 200 remains in the drive position; however, the transmission 108 is locked by movement of the secondary carrier 204 from the normal position to the failsafe position. Thus, in FIG. 4C the transmission 108 is locked independent of the position of the primary carrier 200, which is still in the drive position. Only a small amount of electrical energy is needed and only for a very short time period to pull the pin 348 from the detent 292 to activate the default to park configuration of the park lock system 124.

Figures 5A, 5B, 5C:
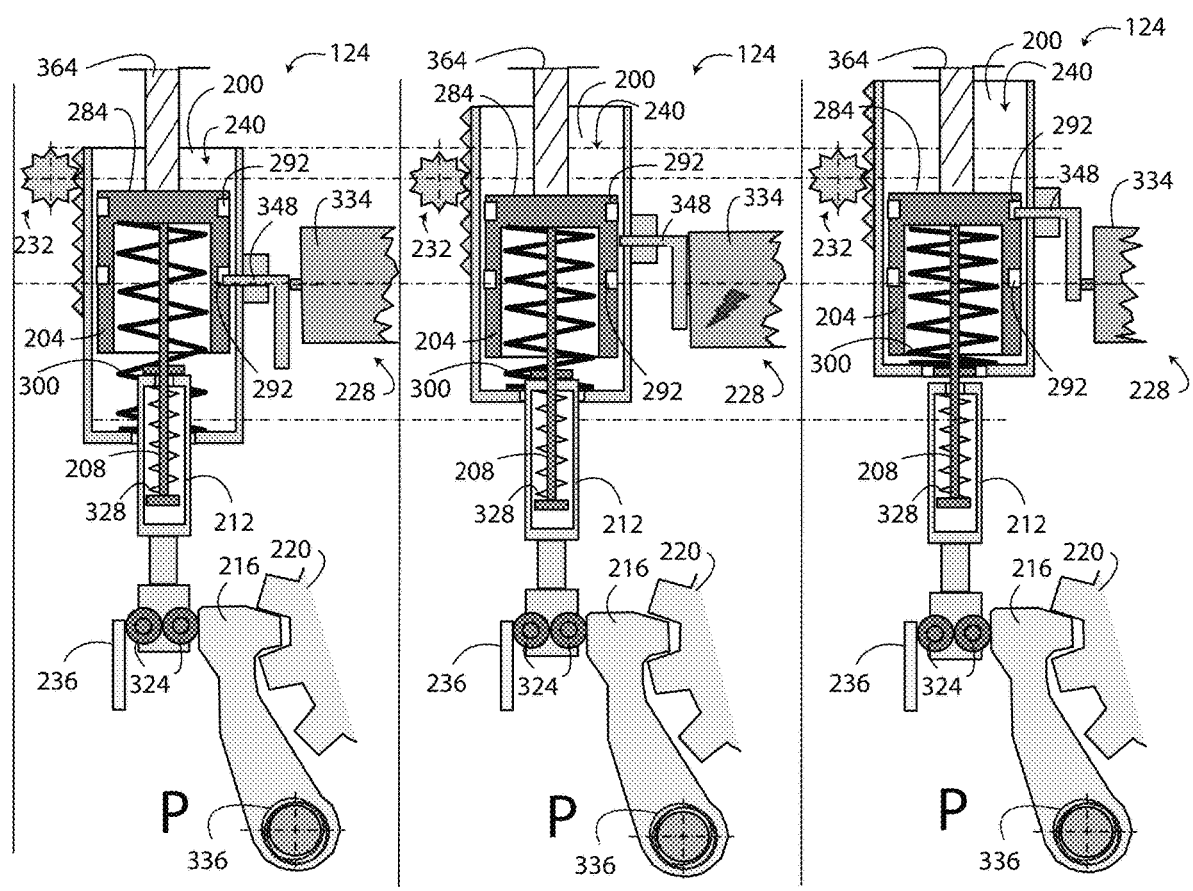
FIG. 5A is an elevational view substantially the same FIG. 4C and is included for convenience of description, a reset stopper is shown in FIG. 5A that is not shown in FIG. 4C.
FIG. 5B is an elevational view of the park lock system of FIG. 1, showing the primary carrier and the secondary carrier in intermediate positions during a reset process.
FIG. 5C is an elevational view substantially the same as FIG. 3C and is included for convenience of description.

FIGS. 5A, 5B, and 5C illustrate a reset process for moving the secondary carrier 204 back to the normal position from the failsafe position. The control unit 156 executes the reset process based on input from the position sensor 296, which indicates the position of the secondary carrier 204. In one embodiment, when the secondary carrier 204 is in the failsafe position and electrical power is available from both of the DC power supplies 116, 136, the control unit may execute the reset process. In FIG. 5A, which is the same as FIG. 4C, the first actuator 228 was activated to pull the pin 348 from the upper detent 292 and the biasing member 300 has moved the secondary carrier 204 to the failsafe position. The de-energization of the first actuator 228 has resulted in the pin 348 becoming seated in the lower detent 292.

FIGS. 5A, 5B and 5C, also illustrate a reset stopper 364. In one embodiment, the reset stopper 364 is fixed in position relative to the second actuator 228 and the wall 236 and is configured to extend into the primary internal space 240. In another embodiment, the reset stopper 364 is located outside of the primary internal space 240 during normal operation of the park lock assembly 124 and is moved into the primary internal space 240 only during the reset process. The reset process includes activating the first actuator 228 and the second actuator 232. In FIG. 5B, both actuators 228, 232 are activated and the second actuator 232 is moving the primary carrier 200 to the park position. The movement of the primary carrier 200 moves the top wall 284 of the secondary carrier 204 against the reset stopper 364 to compress the biasing member 300. In FIG. 5C, the primary carrier 200 is moved to the park position, the top wall 284 is positioned against the reset stopper 364, the biasing spring 300 is compressed, and the pin 284 is aligned with and received by the upper detent 292. As such, in FIG. 5C, the park lock system 124 is reset and available for further operations.

Figure 6:
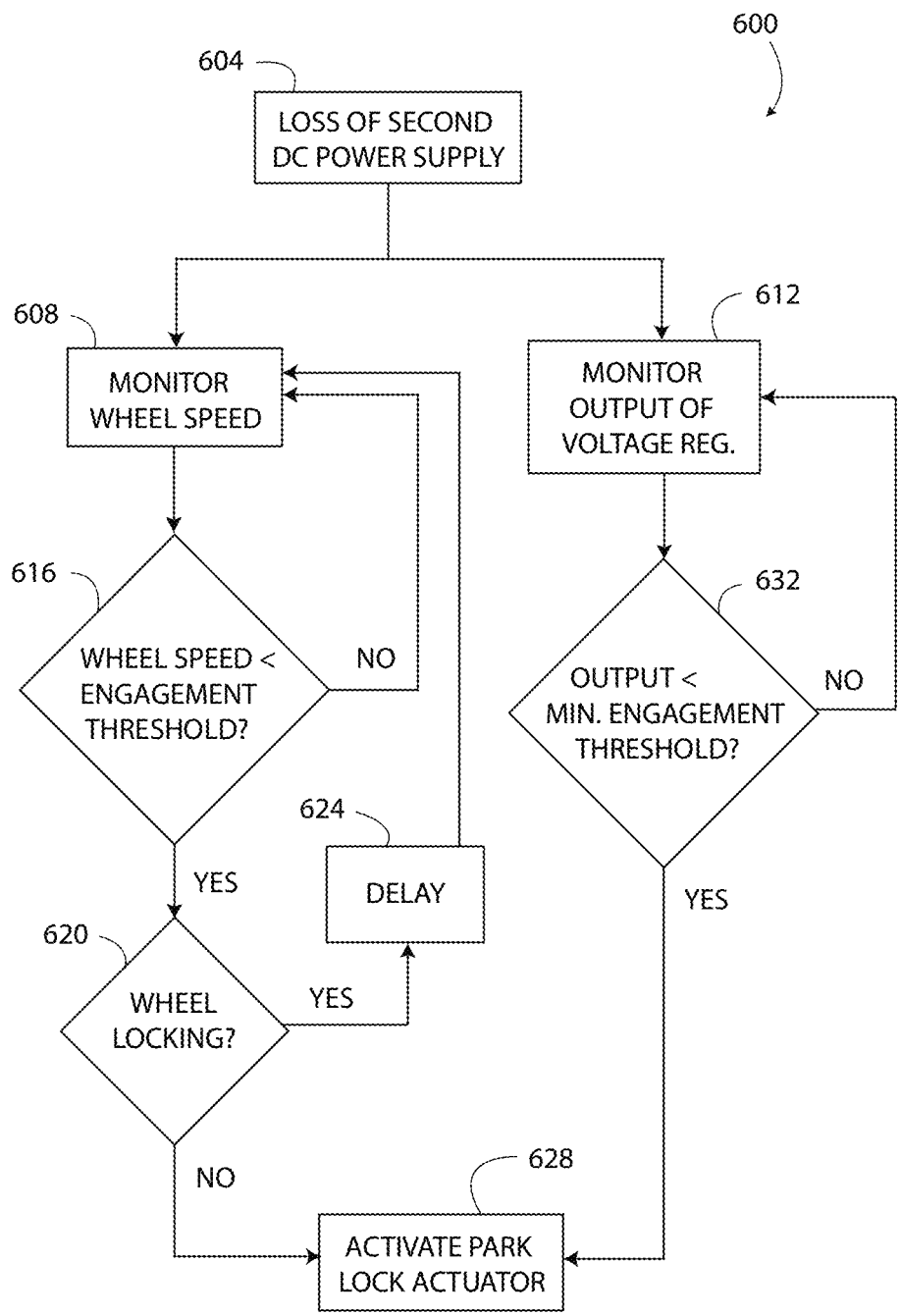
FIG. 6 is a flowchart illustrating an exemplary method of operating the vehicle that includes the park lock system of FIG. 1.

With reference to FIG. 6, the exemplary method 600 of operating the vehicle 100 and the park lock system 124 is disclosed. The method 600 includes configuring the park lock system 124 to maintain the transmission 108 in the unlocked configuration when an electrical issue is identified to enable a user to bring the vehicle 100 to a controlled stop. When the vehicle 100 is driven, the control unit 156 is configured to monitor the status of at least the second DC power supply 136. For example, the control unit 156 or controllers connected to the vehicle control unit 128 monitor a voltage level or state of charge of the second DC power supply 136 during operation of the vehicle 100.

At block 604, the control unit 156 monitors the second DC power supply 136 to determine if the second DC power supply 136 is available or unavailable. The second DC power supply 136 is typically used to power the park lock system 124 and is the primary supply voltage of the park lock system 124. The loss or unavailability of the second DC power supply 136 may occur due to battery failure issues or battery charge issues, for example. The "loss" of the second DC power supply 136 includes a full loss and also identification that the voltage level or state of charge of the DC power supply 136 has fallen below a voltage value or predetermined threshold level. Therefore, the second DC power supply 136 is "available" when the voltage level or state of charge is greater than or equal to the voltage value or the predetermined threshold level. In response to the detection of the loss of the second DC power supply 136, the control unit 156 executes two processes in parallel with the first process beginning at block 608 and the second process beginning at block 612. Each process is described herein.

At block 604, even though the second DC power supply 136 is unavailable or lost, the transmission 108 remains in the drive mode. That is, the park lock system 124 does not automatically revert to the park mode in response to the loss or unavailability of one or more of the first and the second DC power supplies 116, 136. Even with no electrical power at all, the park lock system 124 maintains the transmission 108 in the drive mode. The "normally open" configuration of the park lock system 124 does not require electrical energy of any kind to maintain the pawl 216 in the disengaged position. As a result, the vehicle 100 is easily controllable even when a loss of electrical power occurs.

Additionally, at block 604 the loss of the second DC power supply 136 de-energizes the vehicle control unit 128, which causes the vehicle control unit 128 to stop sending the electrical control signal that is supplied to the switches 144. As a result, when the second DC power supply 136 is lost, the switches 144 default to the open position and the first DC power supply 116 is electrically disconnected from the DC/AC inverter 120 and the capacitor 148. Thus, the loss of the second DC power supply 136 results in a loss of the first DC power supply 116.

Moreover, at block 604 with the loss of the second DC power supply 136 and the switches 144 in the open configuration, at least the park lock system 124 and the speed sensor 132 are supplied with electrical energy from the capacitor 148 (i.e. the secondary supply voltage of the park lock system 124) through the voltage regulator 140. That is, upon failure of the second DC power supply 136 (the primary supply voltage), the capacitor 148 operates as the secondary supply voltage of the park lock system 124 by suppling electrical energy to the voltage regulator 140. In both parallel processes of the method 600, the park lock system 124 is supplied with electrical energy from the capacitor 148 (operating as the secondary supply voltage) through the voltage regulator 140.

Next at block 608, the park lock system 124 has determined that an electrical issue exists and the park lock control unit 156 monitors the vehicle 100 to determine a safe and convenient time to switch the transmission 108 from the drive mode to the park mode. To this end, the control unit 156 monitors the wheel speed of the wheel 104 with the speed sensor 132. At block 616, if the wheel speed is greater than or equal to a predetermined value or predetermined engagement threshold, then the park lock system 124 is prevented from locking the transmission 108 and the control unit 156 continues to monitor the wheel speed in block 608. If at block 616, however, the wheel speed is less than the predetermined value or predetermined engagement threshold, then the method 600 moves to block 620. The predetermined value or predetermined engagement threshold, in one embodiment, is a wheel speed (i.e. a predetermined speed value) that corresponds to a vehicle 100 speed of about three kilometers per hour (3 kph).

At block 620, the control unit 156 determines if wheel locking is occurring. Wheel locking corresponds to zero rotational speed of one or more of the wheels 104 of the vehicle 100 while the vehicle 100 is not immobilized. Wheel locking occurs during hard breaking and when an antilock braking system has failed due to a lack of electrical power, for example. Wheel locking may also occur due to hard or normal braking during hazardous weather conditions and poor roadway conditions, for example.

At block 624, if the controller 154 detects wheel locking, then the method 600 moves back to block 608 after instituting a time delay period. Specifically, the control unit 156 implements the delay, the wheel speed is monitored again, and the park lock system 124 is prevented from locking the transmission 108. The delay in one embodiment is a predetermined time period from one to twenty seconds.

If no wheel locking is detected at block 620, then at block 628 the control unit 156 has determined that it is an appropriate time to configure automatically the transmission 108 in the park mode. At block 628, the vehicle 100 is at a safe low speed (or no speed) and no wheel locking is occurring. Thus, the control unit 156 automatically places the transmission 108 in park without user intervention or user inputs.

In blocks 608, 616, 620, 624, and 628, the second DC power supply 136 (i.e. the primary supply voltage of the park lock system 124) is unavailable or is lost and the park lock system 124 is supplied with electrical energy from the capacitor 148 (operating as the secondary supply voltage) through the voltage regulator 140. The charge in the capacitor 148 is the result of at least one of (i) the previous connection to the first DC power supply 116 (i.e. prior to the opening of the switches 144), or (ii) the DC/AC inverter 120 according to an energy regeneration process of the traction motor 112. Thus, even though the second DC power supply 136 is unavailable and the first DC power supply 116 is disconnected, at least the park lock system 124 (including the speed sensor 132) remain supplied with electrical energy from the charge stored in the capacitor 148.

With reference again to the parallel process beginning at block 612, the control unit 156 monitors the output of the voltage regulator 140 to determine if the secondary supply voltage provided by the capacitor 148 is available or unavailable.

At block 632, the control unit 156 monitors at least one of (i) the magnitude of the voltage at the voltage regulator 140, and (ii) the voltage and the electrical energy of the capacitor 148. Accordingly, at block 632 the control unit 156 monitors the output of the secondary supply voltage. If the control unit 156 determines that the secondary supply voltage provided by capacitor 148 has more than enough electrical energy or voltage than is needed to actuate the first actuator 228, then the method 600 moves to block 612 and the control unit 156 continues to monitor the output of the secondary supply voltage. If, however, at block 632 it is determined that the voltage level or energy state of the secondary supply voltage has fallen below a predetermined value or a minimum engagement threshold level for engaging "default to park" mode, then the method 600 moves to block 628 and the park lock system 124 activates the first actuator 228 to configure the transmission 108 in park mode.

When the method 600 transitions from block 632 to block 628 it is the last opportunity for the vehicle 100 to engage the park mode of the transmission 108. In particular, the control unit 156 has determined that the second DC power supply 136 is unavailable, and the transmission 108 should be configured in the park mode with the small remaining amount of electrical energy available to the vehicle 100 as provided by the secondary power supply of the capacitor 148. The transition from block 632 to block 628 occurs independent of blocks 608, 616, 620, and 624. Accordingly, the transition from block 632 to block 628 occurs even if wheel locking is occurring and/or even if the wheel speed is greater than the engagement threshold or the predetermined value.

As noted above, at blocks 612 and 632, the second DC power supply 136 has failed and the first DC power supply 116 is disconnected by the open switches 144. The park lock system 124 is supplied with electrical energy from the secondary power supply that is "regenerated" from rotation of the traction motor 112 and stored in the high voltage DC link capacitor 148. Accordingly, the method 600 is operable when the second DC power supply 136 is unavailable by converting the potential energy of the moving vehicle 100 into electricity using the traction motor 112 as an electrical generator. The method 600 operates until the energy stored in the capacitor 144 is depleted or almost depleted, at which point the park lock system 124 activates the first actuator 228 to configure the transmission 108 in park mode (i.e. block 628).

The method 600 and the park lock system 124 offer improvements over known systems. The park lock system 124 does not lock the transmission 108 immediately upon failure of the second DC power supply 136. Instead, the park lock system 124 is locked either (i) at the last possible moment (blocks 628 and 632), or when the vehicle 100 is stationary or almost stationary (blocks 616, 620, and 628).

The park lock system 124 is configured to maintain the transmission 108 in the drive mode without drawing any electrical energy. That is, the park lock system 124 has a "normally open" configuration that does not require an energy supply to keep the pawl 216 disengaged from the park lock wheel 220. The positions of the primary carrier 200 and the secondary carrier 204 are maintained in response to a partial or total loss of electrical power.

The park lock system 124 does not require more energy than is available from the vehicle 100 in all possible driving/power failure situations. This benefit is achieved by using a low current draw type first actuator 228, and by obtaining electrical energy from the first DC power supply 116 when a problem with the second DC power supply 136 occurs.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A park lock system for a vehicle transmission, comprising:
   a movable primary carrier defining a primary internal space;
   a secondary carrier located within the primary internal space and movable relative to the primary carrier;
   a rod fixedly extending from the secondary carrier and including a rod portion located outside of the primary internal space;
   a first biasing member located within the primary internal space between the secondary carrier and the primary carrier;
   an engagement carrier configured to receive the rod portion and including a terminal portion operably connected to a pawl and a park lock wheel to lock and to unlock the vehicle transmission;
   a first actuator configurable in a first state or a second state,
   wherein in the first state of the first actuator (i) the first actuator prevents movement of the secondary carrier relative to the primary carrier, (ii) movement of the primary carrier to a park position locks the vehicle transmission, and (iii) movement of the primary carrier to a drive position unlocks the vehicle transmission, and
   wherein in the second state of the first actuator (i) the secondary carrier is movable relative to the primary carrier, and (ii) the vehicle transmission is locked independent of the position of the primary carrier.

2. The park lock system as claimed in claim 1, wherein:
   the first actuator includes a pin operably connected to a solenoid,
   in the first state of the first actuator, the pin extends through an opening in the primary carrier and is positioned in a detent of the secondary carrier,
   in the second state of the first actuator, the pin is removed from the detent,
   the first state is a de-energized state, and
   the second state is an energized state.

3. The park lock system as claimed in claim 1, further comprising:
   a second actuator configured to move the primary carrier to the park position and the drive position.

4. The park lock system as claimed in claim 3, further comprising:
   a rack mounted on the primary carrier,
   wherein the second actuator includes a pinon operably connected to the rack.

5. The park lock system as claimed in claim 1, wherein when the first actuator is in the second state, the first biasing member biases the secondary carrier and the pin away from the pawl.

6. The park lock system as claimed in claim 5, wherein:
   the primary carrier defines an engagement opening through which the rod extends, and
   when the first actuator is in the second state, the biasing member biases a portion of the engagement carrier into the primary internal space through the engagement opening.

7. The park lock system as claimed in claim 5, further comprising:
   a second biasing member located within the engagement internal space and configured to bias the engagement carrier toward the secondary carrier.

8. A park lock system for a vehicle transmission, comprising;
   a pawl movable to a locked position relative to a park lock wheel and biased toward an unlocked position relative to the park lock wheel;
   a rod operably connected to the pawl and movable to an engaged position and a disengaged position, in the engaged position the pawl is pressed toward the locked position to lock the transmission, and in the disengaged position the pawl is biased to the unlocked position to unlock the transmission;
   a primary carrier operably connected to the rod and movable to a park position and a drive position;
   a biasing member located within the primary carrier; and
   an actuator operably connected to the rod and configurable in a first state and a second state,
   wherein when the actuator is in the first state (i) movement of the primary carrier to the park position moves the rod to the engaged position, and (ii) movement of the primary carrier to the drive position moves the rod to the disengaged position, and
   wherein when the actuator is in the second state the biasing member moves the rod to the disengaged position independent of a position of the primary carrier.

9. The park lock system as claimed in claim 8, further comprising:
   a secondary carrier located within the primary carrier,
   wherein the rod fixedly extends from the secondary carrier.

10. The park lock system as claimed in claim 9, wherein:
the actuator includes a pin operably connected to a solenoid,
wherein in the first state of the actuator, the pin extends through an opening in the primary carrier and is positioned in a detent of the secondary carrier to prevent movement of the secondary carrier relative to the primary carrier, and
wherein in the second state of the actuator, the pin is removed from the detent and the biasing member moves the secondary carrier relative to the primary carrier to move the rod to the disengaged position.

11. The park lock system as claimed in claim 10, wherein:
the first state is a de-energized state, and
the second state is an energized state.

12. The park lock system as claimed in claim 9, wherein when the actuator is in the second state, the biasing member biases the secondary carrier and the rod away from the pawl.

13. The park lock system as claimed in claim 8, further comprising:

an engagement carrier configured to receive a portion of the rod at least partially within an engagement internal space, the engagement carrier including a terminal portion operably connected to the pawl,
wherein the primary carrier defines an engagement opening through which the rod extends, and
wherein when the actuator is in the second state, the biasing member biases a portion of the engagement carrier into the primary carrier through the engagement opening.

14. The park lock system as claimed in claim 8, further comprising:
a rack mounted on the primary carrier; and
another actuator configured to move the primary carrier to the park position and the drive position, the other actuator including a pinon operably connected to the rack.

* * * * *